United States Patent
Takahashi

[19]

[11] Patent Number: 6,052,226
[45] Date of Patent: *Apr. 18, 2000

[54] FRESNEL LENS SHEET FOR REAR PROJECTION SCREEN

[75] Inventor: Katsunori Takahashi, Tokyo-To, Japan

[73] Assignee: Dai Nippon Printing Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,206

[22] Filed: Jul. 11, 1997

[30] Foreign Application Priority Data

Jul. 15, 1996 [JP] Japan .................................. 8-184987

[51] Int. Cl.[7] ........................ G03B 21/60; G03B 21/56
[52] U.S. Cl. ................................ 359/457; 359/443
[58] Field of Search ........................ 359/443, 460, 359/456, 457, 742; 351/161

[56] References Cited

U.S. PATENT DOCUMENTS

| | | | |
|---|---|---|---|
| 3,004,470 | 10/1961 | Ruhle | 359/742 |
| 4,012,136 | 3/1977 | de la Croix et al. | 353/102 |
| 5,146,342 | 9/1992 | Yokoo et al. | 359/457 |
| 5,803,567 | 9/1998 | Nakanishi | 359/457 |

FOREIGN PATENT DOCUMENTS 0 772 077 A2  5/1997  European Pat. Off. .

OTHER PUBLICATIONS

Patent Abstracts of Japan, vol. 006, No. 027 (P–102), Feb. 17, 1982 & JP 56 147140 A (Matsushita Electric Co. Ltd.), Nov. 14, 1981, *abstract* *Figures 1–5*.

Patent Abstracts of Japan, vol. 017, No. 143 (P–1507), Mar. 23, 1993 & JP 04 316010 A (Seiko Epson Corp.), Nov. 6, 1992, *abstract* Figure 3*.

*Primary Examiner*—Safet Metjahic
*Assistant Examiner*—Peter B. Kim
*Attorney, Agent, or Firm*—Parkhurst & Wendel, L.L.P.

[57] ABSTRACT

A Fresnel lens sheet of a multifocal type is intended to be used in combination with a lenticular lens sheet to construct a rear projection screen for a rear projection television receiver. An annular portion (2) of the Fresnel lens sheet at a distance (R) in a range of 0.05 h to 0.5 h, where h is the height of the Fresnel lens sheet, from the optical center (C) of the Fresnel lens sheet, have the shortest focal length $f_{min}$ among those of other portions of the Fresnel lens sheet, whereby uniformity in brightness of a screen employing the Fresnel lens sheet can be achieved. Alternatively, a portion where an exit angle (θ) of outgoing light ray relative to a normal to the surface of the Fresnel lens sheet is the greatest, lies at a distance (R) in a range of 0.3 h to 0.8 h from the optical center (C) of the Fresnel lens sheet, to obtain the same result.

4 Claims, 4 Drawing Sheets

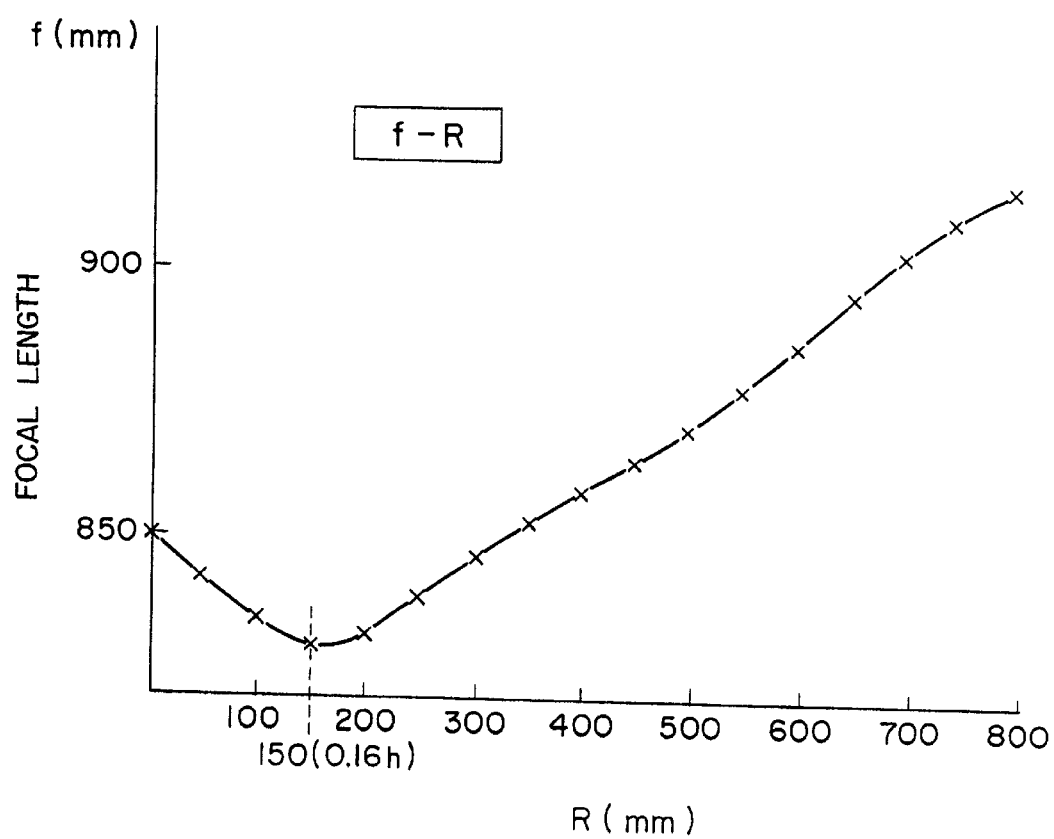
F I G. 4

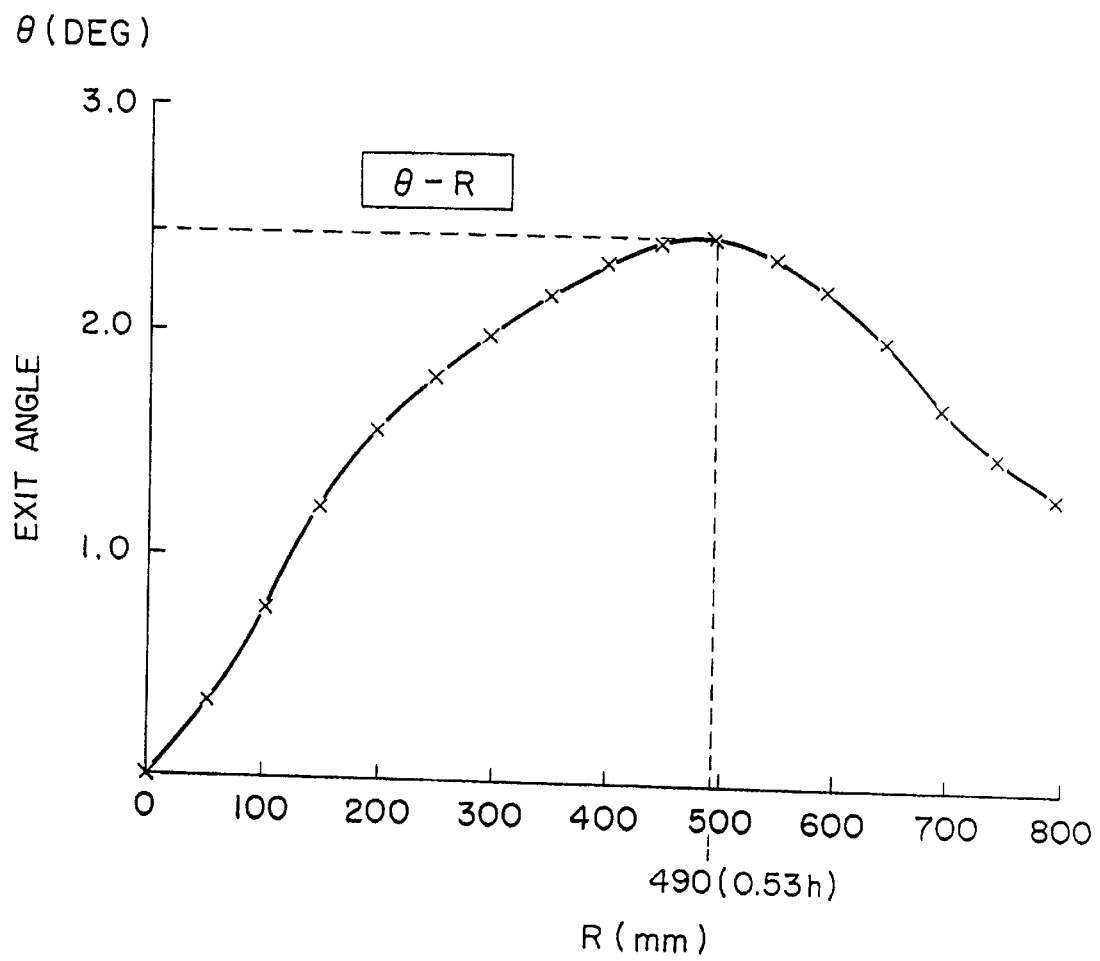
F I G. 5

FRESNEL LENS SHEET FOR REAR PROJECTION SCREEN

BACKGROUND OF THE INVENTION

1. Field of the Invention

The present invention relates to a Fresnel lens sheet to be employed in combination with a lenticular lens sheet in constructing a rear projection sheet for a rear projection television screen, and to a rear projection screen employing the Fresnel lens.

2. Description of the Related Art

Fresnel lens sheets are classified into those of a single-focal type which refract all light rays that have fallen thereon so as to collect at a single focus as shown in FIG. 6A, and those of a multifocal type which refract light rays that have fallen on regions near the periphery at focuses at longer focal lengths, and refract light rays that have fallen on regions near the center, at focuses at shorter focal lengths, respectively as shown in FIG. 6B. The center of a Fresnel lens is an optical center of the Fresnel lens where the lens angle at the lens top relative to a plane parallel to the major plane of the Fresnel lens, is nearly zero.

When a rear projection screen employing the conventional Fresnel lens sheet is employed in a rear projection television receiver, most part of light rays collected at an optimum observation point of the rear projection television receiver are those traveling through the central region of the rear projection screen and, consequently, an observer feels that a region around the center of the rear projection screen is brightest. Such a phenomenon is called "hot band phenomenon" which makes the central region of the rear projection screen look very bright and makes the peripheral region of the same look dark, spoiling the uniformity in brightness of the rear projection screen.

SUMMARY OF THE INVENTION

It is an object of the present invention to provide a Fresnel lens sheet capable of securing uniformity in brightness of a screen employing the Fresnel lens sheet, and a rear projection screen employing the same Fresnel lens sheet.

According to one aspect of the present invention, a Fresnel lens sheet to be used in combination with a lenticular lens sheet to form a rear projection screen for a rear projection television receiver has a portion which is at a distance from an optical center of the Fresnel lens sheet and has a shortest focal length among those of portions of the Fresnel lens sheet, the distance being in a range of 0.05 h to 0.5 h, where h is a height of the rear projection screen.

In an another aspect of the Fresnel lens sheet of the present invention, a portion where the exit angle θ of outgoing light rays, i.e., the angle of the path of outgoing light rays to a normal to the surface of the Fresnel lens sheet at the exit point, is the greatest among those of portions of the Fresnel lens sheet, is at a distance in a range of 0.3 h to 0.8 h from an optical center of the Fresnel lens sheet, where h is the height of the Fresnel lens.

A rear projection screen in accordance with the present invention is constructed by combining each of the above Fresnel lens sheet and a lenticular lens sheet.

The above and other objects, features and advantages of the present invention will become more apparent from the following description taken in connection with the accompanying drawings.

BRIEF DESCRIPTION OF THE DRAWINGS

FIG. 4 is a graph showing a f-R characteristic of the Fresnel lens sheet of FIG. 1;

FIG. 5 is a graph showing a θ-R characteristic of the Fresnel lens sheet of FIG. 3.

DESCRIPTION OF THE PREFERRED EMBODIMENTS

Figure 1:
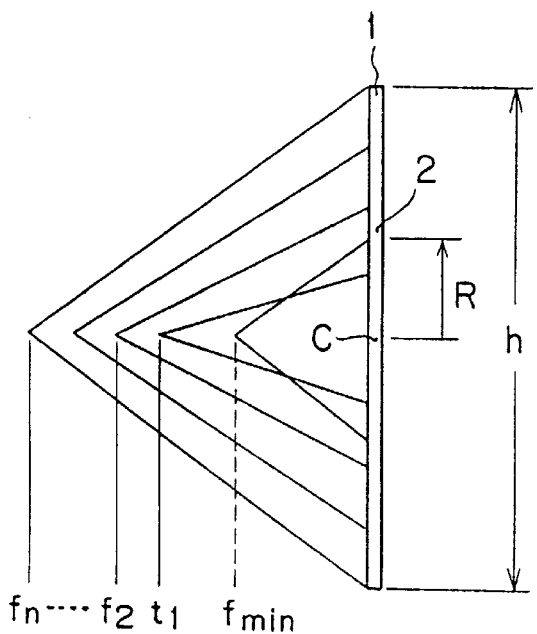
FIG. 1 is a side view of a Fresnel lens sheet of a first embodiment according to the present invention.
Figure 2:
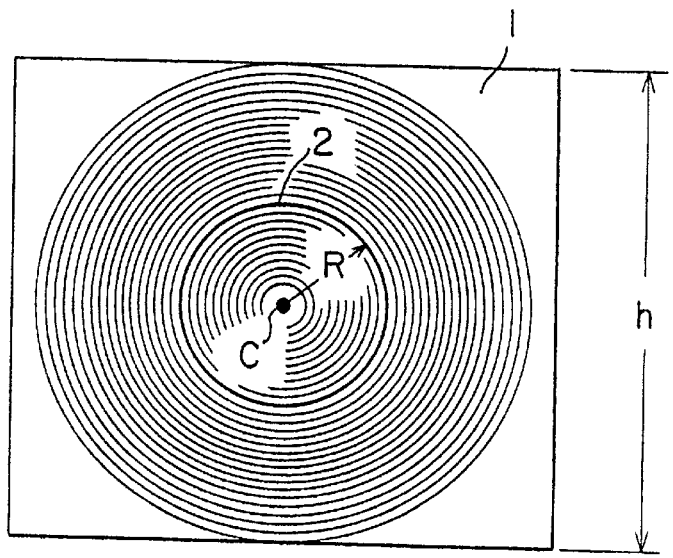
FIG. 2 is a front view of the Fresnel lens shown in FIG. 1.
Figure 6A:
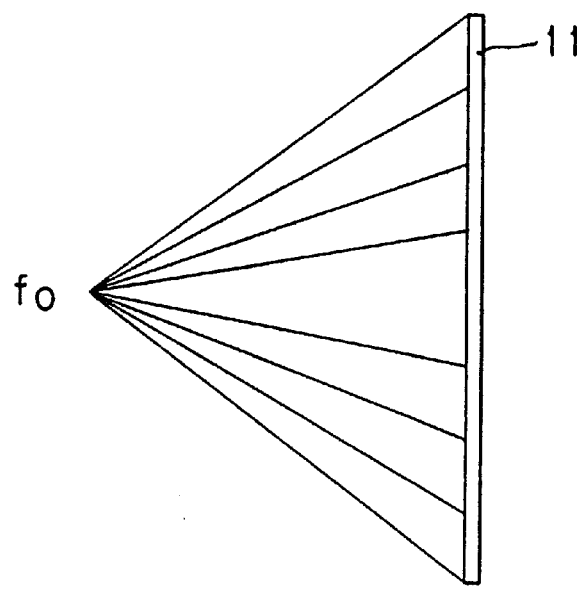
FIGS. 6A and 6B illustrate the focal length of conventional Fresnel lens sheets.
Figure 6B:
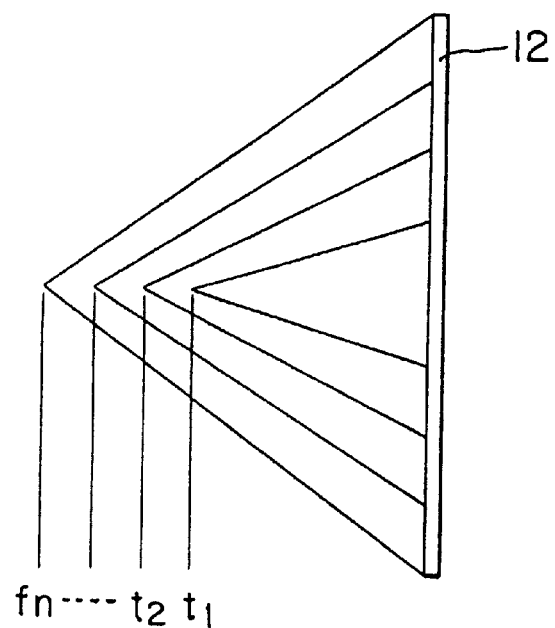

Referring to FIGS. 1 and 2 showing a Fresnel lens sheet 1 of a first embodiment according to the present invention to be used in combination with a lenticular lens sheet, an annular portion 2 of the Fresnel lens sheet 1 at a distance R from an optical center C of the Fresnel lens sheet 1, is made to give a shortest focal length $f_{min}$. According to the present invention, the distance R is in the range of 0.05 h to 0.5 h, where h is the height of the Fresnel lens sheet 1. If R<0.05 h, the portion 2 having the shortest focal length $f_{min}$ would lie in a "hot band" or central brightest region. If R>0.5 h, outer peripheral region of the Fresnel lens sheet 1 would have too short focal lengths, which increases loss of quantity of light and causes coloring. Accordingly, it is desirable that the distance R of the portion 2 having the shortest focal length $f_{min}$ meets an inequality: 0.05 h≦R≦0.5 h. The Fresnel lens sheet 1 reduces concentration of light rays passing through a central region thereof at an observation point and directs light rays passing through regions, such as the outer peripheral region, of the sheet which look darkish, toward the observation point whereby the uniformity of brightness of the Fresnel lens sheet 1 is improved and the effect of the "hot band phenomenon" is reduced.

Figure 3:
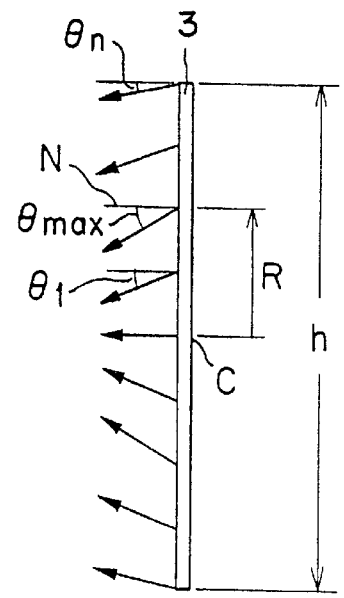
FIG. 3 is a side view of a Fresnel lens sheet of a second embodiment according to the present invention.

Referring to FIG. 3 showing a Fresnel lens sheet 3 of a second embodiment according to the present invention, the Fresnel lens sheet 3 is designed so that a path of a light ray outgoing from each of portions of the Fresnel lens sheet 3 at a distance R from the optical center C of the Fresnel lens 2 is inclined at a maximum exit angle $\theta_{max}$ to a normal N to the surface of the Fresnel lens sheet 3 at the same portion. According to the invention, the distance R is in the range of 0.3 h to 0.8 h, where h is the height of the Fresnel lens sheet 3. Since the Fresnel lens sheet 1 or 3 is preferably rectangular in shape, the range 0.3 h to 0.8 h includes a distance, from 0.3 h to the farthest edge of the Fresnel lens sheet, where h is the height of the Fresnel lens sheet. If R<0.3 h, the brightness of the outer peripheral region of the Fresnel lens sheet 3 will be reduced by shading. If R>0.8 h, unbalanced loss of quantity of light would occur, causing coloring. Accordingly, it is desirable that the distance R meets an inequality: 0.3 h ≦R≦0.8 h. The peripheral region of the Fresnel lens sheet 3 direct light rays effectively toward an observation point, so that the brightness of the peripheral portion of the Fresnel lens sheet 3 is enhanced to improve the uniformity of brightness distribution on the Fresnel lens sheet 3. Examples of the Fresnel lens sheets 1 and 3 of the present invention will be described hereinafter.

Example 1

A Fresnel lens sheet having an f-R characteristic as shown in FIG. 4(f is the focal length) is Example 1 of the Fresnel lens sheet 1 of FIG. 1. The Fresnel lens sheet in Example 1 is 920 mm in height h and is intended for used in constructing a 60 in. screen.

| Focal length f (mm) | Distance R (mm) |
|---|---|
| 850 | 0 |
| 830 (Minimum) | 150 (0.16h) |
| 915 | 800 |

As one of ordinary skill in the art are aware, in a conventional rear projection television receiver (not shown), a projection screen is positioned between a light source and an opposite observation side. The screen typically includes a Fresnel sheet superposed on a lenticular sheet. The Fresnel sheet is positioned on the side of the light source, while the lenticular sheet is positioned on the observation side.

A rear projection screen was fabricated by combining the Fresnel lens sheet in Example 1 and a lenticular lens sheet, and the rear projection screen was incorporated into a rear projection television receiver for the sensory test of the performance of the rear projection screen. The rear projection screen had an excellent uniform brightness distribution.

Example 2

A Fresnel lens sheet having a θ-R characteristic as shown in FIG. 5 (θ is the exit angle) is Example 2 of the Fresnel lens sheet 2 of FIG. 3. The Fresnel lens sheet in Example 2 is 920 mm in height h and is intended for used in constructing a 60 in. screen for a television receiver of 940 mm in projection distance.

| Exit angle θ (Degree) | Distance R (mm) |
|---|---|
| 0.8 | 100 |
| 2.5 (Maximum) | 490 (0.53h) |
| 1.75 | 800 |

A rear projection screen was fabricated by combining the Fresnel lens sheet in Example 2 and a lenticular lens sheet, and the rear projection screen was incorporated into a rear projection television receiver for the sensory test of the performance of the rear projection screen. The rear projection screen had a peripheral portion of a satisfactory brightness and an excellent uniform brightness distribution.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A Fresnel lens sheet for use in a superposed arrangement with a lenticular lens sheet to form a rear projection screen having a height and an optical center, the Fresnel lens sheet comprising:

only a single an intermediate annular portion disposed at a preselected distance from the optical center and having a shortest focal length of all of the annular portions thereof, said distance being in the range of 0.05 h to 0.5 h, where h is the height of the rear projection screen.

2. A Fresnel lens sheet for use in a superposed arrangement with a lenticular lens sheet to form a rear projection screen having a height and an optical center, the Fresnel lens sheet comprising:

only a single intermediate annular portion disposed at a position where an exit angle of the outgoing light relative to normal to a plane of the Fresnel lens sheet is greatest of all exit angles, said annular portion being disposed at a distance of 0.3 h to a farthest edae of the Fresnel lens sheet from the optical center thereof, where h is the height of the Fresnel lens.

3. A rear projection screen, comprising:

a Fresnel lens sheet and a lenticular lens sheet superposed on the Fresnel lens sheet, said Fresnel lens sheet having a height and an optical center and including only a single intermediate annular portion disposed at a preselected distance from the optical center and having a shortest focal length of all of the annular portions thereof, said distance being in the range of 0.05 h to 0.5 h, where h is the height of the rear projection screen.

4. A rear projection screen, comprising:

a Fresnel lens sheet and a lenticular lens sheet superposed on the Fresnel lens sheet, said Fresnel lens sheet having a height and an optical center and including only a single intermediate annular portion disposed at a position where an exit angle of the outgoing light relative to normal to a plane of the Fresnel lens sheet is greatest of all exit angles, said annular portion being disposed at a distance of 0.3 h to a farthest edae of the Fresnel lens sheet from the optical center thereof, where h is the height of the Fresnel lens.

* * * * *